(12) United States Patent
Leiber et al.

(10) Patent No.: US 7,024,675 B1
(45) Date of Patent: Apr. 4, 2006

(54) CYLINDRICAL OPTICAL DATA MEMORY

(75) Inventors: Jorn Leiber, Heiligenstedtenerkamp (DE); Bernhard Mussig, Seevetal (DE); Stefan Stadler, Hamburg (DE)

(73) Assignee: Tesa AG, Hamburg (DE)

( * ) Notice: Subject to any disclaimer, the term of this patent is extended or adjusted under 35 U.S.C. 154(b) by 0 days.

(21) Appl. No.: 10/030,474

(22) PCT Filed: May 23, 2000

(86) PCT No.: PCT/EP00/04675

§ 371 (c)(1),
(2), (4) Date: Feb. 20, 2002

(87) PCT Pub. No.: WO01/04881

PCT Pub. Date: Jan. 18, 2001

(30) Foreign Application Priority Data

Jul. 12, 1999 (DE) .......................... 199 32 900

(51) Int. Cl.
G11B 7/00 (2006.01)
G11B 7/085 (2006.01)
G11B 7/24 (2006.01)

(52) U.S. Cl. .................. 720/746; 242/535.1; 369/94

(58) Field of Classification Search .............. 369/287, 369/97, 94, 100, 286, 288, 272; 235/487, 235/449, 454; 428/64.4; 430/270.11; 720/746; 242/348, 348.1, 358.1, 541.2, 535.1, DIG. 3
See application file for complete search history.

(56) References Cited

U.S. PATENT DOCUMENTS

| 3,288,389 | A | * | 11/1966 | Gersch et al. ............ 242/348.1 |
| 3,823,276 | A | * | 7/1974 | Maslowski et al. ....... 369/53.11 |
| 4,970,707 | A | * | 11/1990 | Hara et al. ................ 369/44.11 |
| 5,034,943 | A | * | 7/1991 | Antonov et al. ............ 369/260 |
| 5,077,724 | A | | 12/1991 | Gregg |
| 5,109,374 | A | * | 4/1992 | Tsunoda et al. ............. 369/100 |
| 5,205,178 | A | * | 4/1993 | Odernheimer ........... 73/863.12 |
| 5,272,689 | A | * | 12/1993 | Tsujioka et al. ....... 369/112.23 |
| 5,297,132 | A | * | 3/1994 | Takano et al. .............. 369/284 |
| 5,311,499 | A | * | 5/1994 | Hwang .................... 369/275.2 |
| 5,369,631 | A | * | 11/1994 | Hwang ........................ 369/113 |
| 5,382,463 | A | * | 1/1995 | Adkins et al. .............. 428/141 |
| 5,587,993 | A | * | 12/1996 | Gregg ........................ 369/291 |
| 5,764,583 | A | * | 6/1998 | Cliff et al. .............. 365/230.03 |

(Continued)

FOREIGN PATENT DOCUMENTS

| DE | 29816802 U1 | * | 2/2000 |
| EP | 323167 A2 | * | 7/1989 |
| EP | 0 352 194 | | 1/1990 |
| EP | 0 360 144 | | 3/1990 |
| EP | 0 514 589 | | 11/1992 |
| EP | 750308 A1 | * | 12/1996 |
| JP | 55 080832 | | 6/1980 |
| JP | 60-52941 | | 3/1985 |
| JP | 61099981 A | * | 5/1986 |
| JP | 61145746 A | * | 7/1986 |
| JP | 63304429 A | * | 12/1988 |
| JP | 01256042 A | * | 10/1989 |

(Continued)

OTHER PUBLICATIONS

Optimem Das Projekt OptiMem verfolgt im Wesentlichen drei Ziele: pp 1–8.

Certified Translation of U.S. Appl. No. 10/030,475, filed Feb. 20, 2002.

Copy of allowed claims of U.S. Appl. No. 10/030,475, (claims 1–10 and 12–33).

Primary Examiner—William Klimowicz

(57) ABSTRACT

A data storage medium includes an optical information carrier comprising a spiral-wound polymer film. The central area of the data storage medium is provided with a recess whose periphery is formed by the innermost winding of the polymer film.

26 Claims, 1 Drawing Sheet

U.S. PATENT DOCUMENTS

| | | | |
|---|---|---|---|
| 5,838,653 A | | 11/1998 | Faris |
| 5,871,881 A | * | 2/1999 | Nishida et al. ........ 430/270.11 |
| 5,890,674 A | | 4/1999 | Major |
| 6,016,984 A | * | 1/2000 | Trafton et al. ........... 242/348.1 |
| 6,386,458 B1 | * | 5/2002 | Leiber et al. ............... 235/487 |
| 2003/0142619 A1 | * | 7/2003 | Mussig et al. ............. 369/272 |
| 2003/0156524 A1 | | 8/2003 | Stadler et al. |
| 2003/0161018 A1 | | 8/2003 | Stadler et al. |
| 2003/0165105 A1 | | 9/2003 | Leiber et al. |
| 2003/0165746 A1 | | 9/2003 | Stadler et al. |
| 2003/0169674 A1 | | 9/2003 | Leiber et al. |
| 2003/0179277 A1 | | 9/2003 | Stadler et al. |
| 2004/0036187 A1 | | 2/2004 | Leiber et al. |

FOREIGN PATENT DOCUMENTS

| | | | |
|---|---|---|---|
| JP | 02098822 A | * | 4/1990 |
| JP | 03023517 A | * | 1/1991 |
| JP | 03134852 A | * | 6/1991 |
| JP | 05109121 A | * | 4/1993 |
| JP | 05334749 A | * | 12/1993 |
| JP | 6-20292 | | 1/1994 |
| JP | 06060461 A | * | 3/1994 |
| JP | 09171235 A | * | 6/1997 |
| WO | WO 00 17864 | | 3/2000 |
| WO | WO 200104880 A1 | * | 1/2001 |

* cited by examiner

CYLINDRICAL OPTICAL DATA MEMORY

This application is the U.S. national phase of international application PCT/EP00/04675 filed May 23, 2000 which designated the U.S.

BACKGROUND AND SUMMARY

The invention relates to a data storage medium having an optical information carrier which comprises a spiral-wound polymer film.

DE-298 16 802 describes a data storage medium having an information carrier, wound in a plurality of plies onto a winding core in a spiral fashion, for optically readable information units. The information carrier may comprise a polymer film, with an adhesion layer being located between each pair of adjacent plies. Information can be written to this data storage medium by locally heating the polymer film by means of a write beam of a data drive, as a result of which the refractive index and thus the reflecting power (reflectivity) change locally at the interface of the polymer film. This may be detected by means of a read beam in the data drive. By focussing the write beam or read beam, information may be specifically written to or read from a preselected ply of the information carrier. The winding core may be optically transparent and may have a recess in its central area that serves to accommodate the read/write device of a data drive. The read/write device is moved relative to the data storage medium, while the data storage medium is stationary, so that the data storage medium need not be balanced to take account of a rapid rotational motion.

In the existing data storage medium, the winding core is a disruptive factor, since its optical quality is inadequate unless it is manufactured with a high degree of elaborateness. Since, when the data storage medium is used in a data drive whose read/write device is situated in the recess of the winding core, the winding core is required to transmit a beam a number of times during each read operation, inadequate optical quality has particularly unfavorable consequences.

It is an object of the invention to improve the existing data storage medium such that no problems arise as a consequence of inadequate optical quality of a winding core and yet the data storage medium can be manufactured economically.

This object is achieved by means of a data storage medium having the features of claim 1. Claim 7 specifies a process for producing a data storage medium of this kind. Claim 9 relates to the use of such a data storage medium in a drive that is attuned to it. Advantageous embodiments of the invention follow from the dependent claims.

The data storage medium of the invention has an optical information carrier which comprises a spiral-wound polymer film. The central area of the data storage medium is provided with a recess whose periphery is formed by the innermost winding of the polymer film. Accordingly, the data storage medium contains no separate winding core such as is the case with the existing data storage medium.

The reading of information or data from the data storage medium of the invention and—if the data storage medium is set up for the input of data by the user—the writing of information to the data storage medium is therefore not hindered by a winding core. Accordingly, the data storage medium of the invention is particularly suitable for use in a drive in which a read device and an optional write device are arranged in the recess in the central area of the data storage medium.

Preferably, the polymer film is wound in a plurality of polymer film plies through which information can be read from a preselected polymer film ply and, optionally, can be written to a preselected polymer film ply. There may be an adhesion layer between each pair of adjacent polymer film plies in order to fix the polymer film plies to one another. For example, from 10 to 30 polymer film plies may be wound atop one another, or else a greater or lesser number. At a polymer film thickness of between 10 µm and 100 µm, preferably below 50 µm or around 35 µm, the information on different polymer film plies can be separated from one another with good resolution by means, for example, of read/write devices which are known from DVD technology. An adhesion layer may, for example, have a thickness in the range between 1 µm and 40 µm, preferably below 25 µA or around 2 µm. A suitable adhesion agent comprises, for example, an acrylate adhesive which is free from air bubbles and which is crosslinked, for example, chemically or by irradiation with UV or electron beams. With a multi-ply data storage medium construction of this kind, it is possible to achieve a very high storage density. Furthermore, even without a winding core, the mechanical stability is sufficient and may be increased further, for example, by inserting the data storage medium into an outer sleeve. Slight deviations of the wound polymer film from an ideal spiral form, such as might arise, for example, in the absence of a winding core by deformation of the windings of the polymer film, are not disruptive to the reading and/or writing of data; since the focus of a read beam and/or of a write beam may be tracked without any problems in order to remain in a preselected ply of the information carrier. If the read device and the optional write device are disposed in the recess in the central area of the data storage medium and are moved relative to the data storage medium in order to read and/or write information, while the data storage medium is stationary, even any possible imbalance in the data storage medium is irrelevant.

Preferably, the refractive index of the adhesion layer differs only slightly from the refractive index of the polymer film, in order to minimize disruptive reflections of the read beam or of the write beam at a boundary between a polymer film ply and an adjacent adhesion layer. It is particularly advantageous if the difference in the refractive indices is less than 0.005. Any difference in the refractive indices may, however, be utilized for the purpose of formatting the data storage medium.

In one preferred embodiment of the data storage medium of the invention, the refractive index of the polymer film can be changed locally by heating. Suitable material for the polymer film comprises, for example, polymethyl methacrylate (PMMA) or biaxially oriented polypropylene (BOPP). If polypropylene, following extrusion to the film, is pretensioned in two planes, a high inherent energy is stored in the material. In the case of local heating, by means of a write beam, for example, there is a severe change in the material by reformation, and this is so even when a relatively small amount of energy is deposited per unit area. In this way it is possible, for example, to achieve a change in refractive index of approximately 0.2 over an area for one stored information unit with a diameter or side length of approximately 1 µm, and this is readily detectable by means of a read beam.

The polymer film may be assigned an absorber which is set up at least partly to absorb a write beam and to emit the generated heat at least partly, locally, to the polymer film. The absorber comprises, for example, dye molecules which are present in the polymer film or in an adhesion layer adjacent to the polymer film, and permits local heating of the polymer film, sufficient to change the refractive index, for a relatively low write beam intensity.

The data storage medium of the invention may be produced by winding the polymer film spirally onto a winding body and subsequently withdrawing the winding body from the central area of the data storage medium. If there is to be an adhesion layer between each pair of adjacent polymer film plies, then in one advantageous embodiment of the process the polymer film is provided on one side with an adhesion layer which faces outward when the polymer film is wound onto the winding body. The adhesion layer is therefore unable to bond to the winding body, so that at the end of the winding operation the winding body can be withdrawn without any problems from the central area of the data storage medium. When the winding operation has been concluded, the outward-facing adhesion layer on the outermost polymer film ply may be covered with an additional, nonadhering material ply or else, for example, may be removed by means of a solvent or rendered nonadhesive by chemical or physical treatment. In this way, a data storage medium of the invention can be produced economically.

BRIEF DESCRIPTION OF THE DRAWINGS

In the text below, the invention is elucidated further with reference to embodiment examples. The drawings show, in FIG. 1, a data storage medium of the invention which comprises a spiral-wound polymer film, in diagrammatic perspective representation, parts of a drive attuned to the data storage medium being arranged in a recess in the central area of the data storage medium.

DETAILED DESCRIPTION OF EXAMPLE EMBODIMENTS

Figure 1:
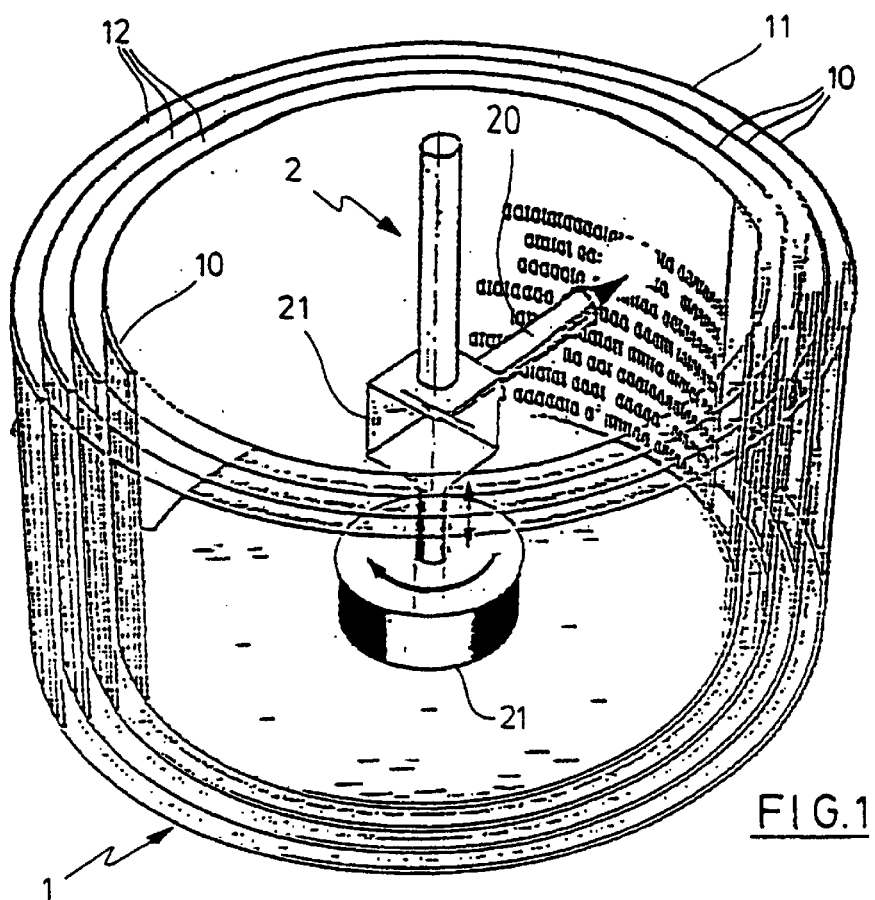

FIG. 1 shows in diagrammatic representation a data storage medium 1 and a read/write device 2 of a drive attuned to the data storage medium 1. The data storage medium 1 comprises a number of plies 10 of a polymer film 11 which serves as information carrier and is wound spirally. The design of the central area of the data storage medium 1 is described in more detail later on with reference to FIG. 3. For ease of illustration, the individual plies 10 of the polymer film 11 have been shown in FIG. 1 as concentric rings, although the plies 10 were formed by spiral winding of the polymer film 11. Between each pair of adjacent plies 10 of the polymer film 11 there is an adhesion layer 12. For reasons of clarity, the adhesion layers 12 have been drawn in FIG. 1 in an increased thickness which is not to scale.

In the embodiment example, the polymer film 11 consists of biaxially oriented polypropylene and has been pretensioned in both surface directions prior to winding. In the embodiment example, the polymer film 11 has a thickness of 35 µm; other thicknesses in the range from 10 µm to 100 µm or even thicknesses lying outside of this range are likewise conceivable. The adhesion layers 12 are free from gas bubbles and in the embodiment example consist of acrylate adhesive, to which an absorber dye has been admixed, at a thickness of 23 µm, preferred layer thicknesses being between 1 µm and 40 µm. In the embodiment example, the data storage medium 1 contains twenty plies 10 of the polymer film 11 and has an external diameter of approximately 30 mm. Its height is 19 mm. A different number of plies 10, or different dimensions, are likewise possible. The number of windings or plies 10 may, for example, be between ten and thirty, or else may be greater than thirty.

The read/write device 2 arranged in a recess in the central area of the data storage medium 1 comprises a read/write head 20 which can be moved backward and forward axially and rotated in the directions of the arrows that have been drawn in, by means of a mechanism 21. The read/write head 20 has optical elements by means of which a light beam (of wavelength, for example, 630 nm or 532 nm) produced by a laser, which is not shown in FIG. 1, may be focussed onto the individual plies 10 of the polymer film 11. Since the read/write head 20 is moved by means of the mechanism 21, it is able to scan fully all plies 10 of the data storage medium 1. In the embodiment example, the data storage medium 1 is stationary. Consequently, it does not need to be balanced to take account of a high rotational speed (and also need not be unwound or rewound), unlike the read/write head 20. For the sake of clarity, the elements provided for balancing the read/write head 20 have not been shown in FIG. 1. The laser mentioned is located outside of the read/write head 20 and is stationary; the laser beam is guided into the read/write head 20 via optical elements.

In the embodiment example, the laser is operated with a beam power of approximately 1 mW for the purpose of storing or writing information to the data storage medium 1. The laser beam serves here as a write beam and is focussed onto a preselected ply 10 of the polymer film 11, in such a way that the beam spot is smaller than 1 µm, the light energy being introduced in the form of short pulses of approximately 10 µs in duration. The energy of the write beam is absorbed in the beam spot, promoted by the absorber in the adjacent adhesion layer 12, leading to a local heating of the polymer film 11 and thus to a local change in the refractive index and in the reflectivity.

In order to read stored information from the data storage medium 1, the laser is operated in continuous wave mode (CW mode). The read beam focussed onto the desired site is reflected as a function of the stored information, and the intensity of the reflected beam is detected by a detector in the read/write device 2.

The data storage medium may also be of an embodiment which cannot be written by the user. In this case, it contains information units written by the manufacturer. In this case, there is no need for a write function in the user's data drive.

In the polymer film 11, the information units are formed by changing the optical properties in a region having a preferred size of less than 1 µm. The information may be stored in binary form; i.e., the local reflectivity adopts only two values at the site of one information unit. In other words, if the reflectivity is above a fixed threshold value, a "1", for example, is stored at the site in question on the information carrier, and, if it is below this threshold value or below a different, lower threshold value, a "0" is correspondingly stored. It is, however, also conceivable for the information to be stored in a plurality of gray stages. This is possible if the reflectivity of the polymer film at the site of an information unit can be changed specifically by defined adjustment of the refractive index without saturation being reached.

Figure 2:
FIG. 2, a diagrammatic side view of a process step in the production of a data storage medium of the invention, FIG. 3, a diagrammatic cross section through the central area of a data storage medium of the invention, and FIG. 4, a diagrammatic cross section through the central area of a data storage medium of the invention in the course of a process step according to another embodiment of the production process.

FIG. 2 illustrates a process step during the production of the data storage medium 1. The starting material is a polymer film made of biaxially oriented polypropylene, which is designated 30 here. On one side, the polymer film 30 has been provided with an adhesion layer 32 of acrylate adhesive. In order to produce the spirallike structure of the information carrier, the polymer film 30 is laid against a cylindrical winding body 34, whose cross section can be seen in FIG. 2. The adhesion layer 32 faces outward. The winding body 34 is then rotated until the polymer film 30 has been wound up fully with the adhesion layer 32. This produces the plies—designated 10 in FIG. 1—of the polymer film 30, with the adhesion layer 32 forming the respective adhesion layers 12 between each pair of adjacent polymer film plies 10. Finally, the winding body 34 is withdrawn in the axial direction. Since the adhesion layer 32 faces outward during winding, there is no adhesion agent between the surface of the winding body 34 and the innermost winding of the polymer film 30; otherwise, the withdrawal of the winding body 34 would be made more difficult.

Figure 3:
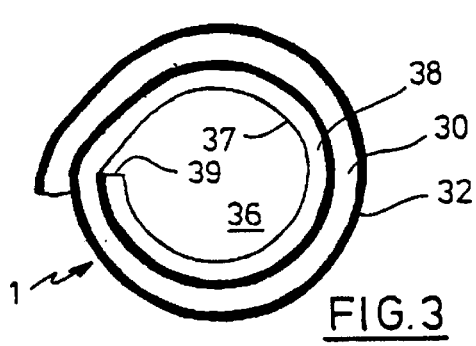

FIG. 3 shows the central area of the data storage medium 1 in a diagrammatic cross-sectional view. The two inner windings of the polymer film 30 are shown, with the adhesion layer 32. For ease of illustration, the thicknesses of the polymer film 30 and of the adhesion layer 2 have been drawn in excessively large in comparison to the diameter of the inner windings, and this applies in a similar way to FIG. 2 as well. Following the withdrawal of the winding body 34, a recess 36 is formed in the central region of the data storage medium 1, the periphery 37 of said recess 36 being formed by the innermost winding 38 of the polymer film 30. Accordingly, when the data storage medium 1 is used, there is, as illustrated by FIG. 1, no disruption by a winding core which would otherwise have to be penetrated once by a write beam emitted by the read/write device 2 and twice, indeed, by a read beam emitted by the read/write device 2 and received following reflection. Furthermore, at the periphery 37 there is no adhesion material, which might, for example, have a tendency to become soiled.

When the polymer film 30 has been fully wound, the adhesion layer 32 on the outside of the outermost winding may be removed or covered, where necessary. It is also conceivable to insert the finished wound body into a sleeve in order to achieve better stability.

The form of the inner windings of the polymer film 30 as shown in FIG. 3 results when the film is wound onto the cylindrical winding body 34 (see FIG. 2). The fact that this form does not correspond to the course of an ideal spiral is a result of the fact that, at the beginning of the second winding, the polymer film 30 has to be displaced radially outward in a more or less abrupt way if it lies against the free end 39 of the polymer film 30. This deformation continues outward, but affects the inner windings in particular.

Figure 4:
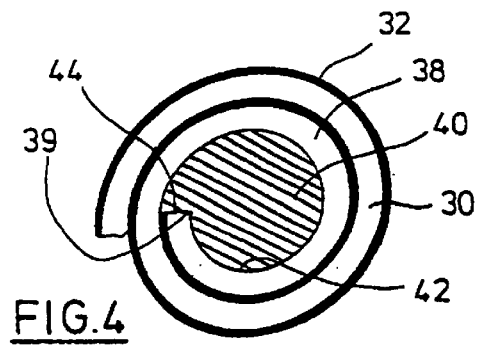

Better results are achieved with a winding body 40 as depicted in FIG. 4. The winding body 40 has, in cross section, a spirallike outer contour 42 with a step 44 whose radial projection corresponds to the thickness of the polymer film 30 plus the thickness of the adhesion layer 32. As FIG. 4 illustrates, the spirallike outer contour 42 guides the starting area of the second winding of the polymer film 30 undisruptedly beyond the area at the free end 39 of the polymer film 30 which lies against the step 44, in the course of the winding operation. Otherwise, the process illustrated by FIG. 4 for producing a data storage medium 1 proceeds in exactly the same way as the process elucidated in connection with FIG. 2. As previously, the representation according to FIG. 4 is also not to scale. Following the withdrawal of the winding body 40, the windings of the polymer film 30 run substantially as in the case of an ideal spiral.

We claim:

1. A process for producing a data storage medium including an optical information carrier which comprises a spiral-wound polymer film, the central area of the data storage medium being provided with a recess whose periphery is formed by the innermost winding of the polymer film, the process comprising spirally-winding the polymer film onto a winding body and subsequently withdrawing the winding body from the central area of the data storage medium.

2. The process as claimed in claim 1, wherein the polymer film is provided on one side with an adhesion layer which faces outward when the polymer film is wound onto the winding body.

3. The process as claimed in claim 2, wherein the winding body comprises a spiral-like outer contour having a step portion with a size corresponding to the combined thickness of the polymer film and the adhesion layer.

4. The process as claimed in claim 1, wherein the winding body comprises a cylindrical wining body.

5. The process as claimed in claim 1, wherein the winding body comprises a spiral-like outer contour.

6. The process as claimed in claim 2, wherein the spiral-like outer contour includes a step portion.

7. The use of the data storage medium in a drive which is attuned to it and comprises a read device and, optionally, a write device, the read device and the optional write device being disposed in a recess in the central area of the data storage medium and being moved relative to the data storage medium, white the data storage medium is stationary, for the purpose of reading and/or writing information, wherein the data storage medium includes a spirally-wound polymer film having an optical property that can be changed locally by heat, the central area of the data storage medium containing no winding core so as to provide the recess, the periphery of the recess being formed by the innermost winding of the polymer film, wherein the data storage medium further comprises an absorber for absorbing the heat and subsequently emitting at least part of the absorbed heat to the polymer film.

8. A method for using a data storage medium including an optical information carrier which comprises a spiral-wound polymer film, the central area of the data storage medium being provided with a recess whose periphery is formed by the innermost winding of the polymer film the method comprising:

disposing a read device having a read beam in the recess of the data storage medium; and moving the read device while keeping the data storage medium stationary in order to direct the read beam onto data storage medium to read data therefrom.

9. The method as claimed in claim 8, wherein the read device is part of a read/write device that also has a write beam, and the method further comprises:

moving the read/write device while keeping the data storage medium stationary in order to direct the write beam onto the data storage medium to write data thereto.

10. A data storage medium including a spirally-wound polymer film having an optical property that can be changed locally by heat, the central area of the data storage medium being provided with a recess which contains no winding core and whose periphery is formed by the innermost winding of the polymer film, wherein the data storage medium further comprises an absorber for absorbing the heat and subsequently emitting at least part of the absorbed heat to the polymer film.

11. The data storage medium as claimed in claim 10, wherein the polymer film is wound in a plurality of polymer film plies trough which information can be read from a preselected polymer film ply and, optionally, written to a preselected polymer film ply.

12. The data storage medium as claimed in claim 11, wherein an adhesion layer is disposed between each pair of adjacent polymer film plies.

13. The data storage medium as claimed in claim 12, wherein the refractive index of the adhesion layer differs only slightly from the refractive index of the polymer film.

14. The data storage medium as claimed in claim 10, wherein the polymer film comprises biaxially-oriented polypropylene.

15. The data storage medium as claimed in claim 10, wherein the polymer film comprises polyethyl methacylate.

16. A data storage medium including a spirally-wound information carrier, the central area of the data storage medium being provided with a recess which contains no winding core and whose periphery is formed by the innermost winding of the information carrier wherein the information carrier is spirally-wound so as to provide a plurality of plies and:
    an adhesion layer is disposed between adjacent plies of the information carrier.

17. The data storage medium as claimed in claim 16, where the information cater comprises a polymer film.

18. The data storage medium as claimed in claim 17, wherein the refractive index of the polymer film can be changed locally by heating.

19. The data storage medium as claimed in claim 17, wherein the polymer film is assigned an absorber which is set up at least partly to absorb a write beam and to emit the generated heat at least partly, locally, to the polymer film.

20. The data storage medium as claimed in claim 17, wherein the polymer film comprises a polymer film having an optical property that can be changed locally by heat.

21. The data storage medium as claimed in claim 16, wherein the adhesion layer comprises acrylate adhesive.

22. The data storage medium as claimed in claim 16, wherein the adhesion layer comprises acrylate adhesive mixed with an absorber dye for absorbing heat.

23. A memory device comprising:
    a data storage medium including a spirally-wound information carrier, the central area of the data storage medium being provided with a recess which contains no winding core and whose periphery is formed by the innermost winding of the information carrier, wherein the information carrier is spirally-wound so as to provide a plurality of plies; and
    a read head provided in the recess for reading data from the spirally-wound information carrier by focusing a light beam on selected individual plies.

24. The memory device according to claim 23, wherein data is read by moving the read head and keeping the data storage medium stationary.

25. A memory device comprising:
    a data storage medium including a spirally-wound information carrier, the central area of the data storage medium being provided with a recess which contains no winding core and whose periphery is formed by the innermost winding of the information carrier, wherein the information carrier is spirally-wound so as to provide a plurality of plies; and
    a read/write head provided in the recess for reading data from and writing data to the spirally-wound information carrier by focusing a light beam on selected individual plies.

26. The memory device according to claim 25, wherein data is read or written by moving the read/write head and keeping the data storage medium stationary.

* * * * *